April 18, 1939.   R. E. GERNDT   2,155,042
FOUR-WHEEL BRAKE EQUALIZER
Original Filed Nov. 2, 1936
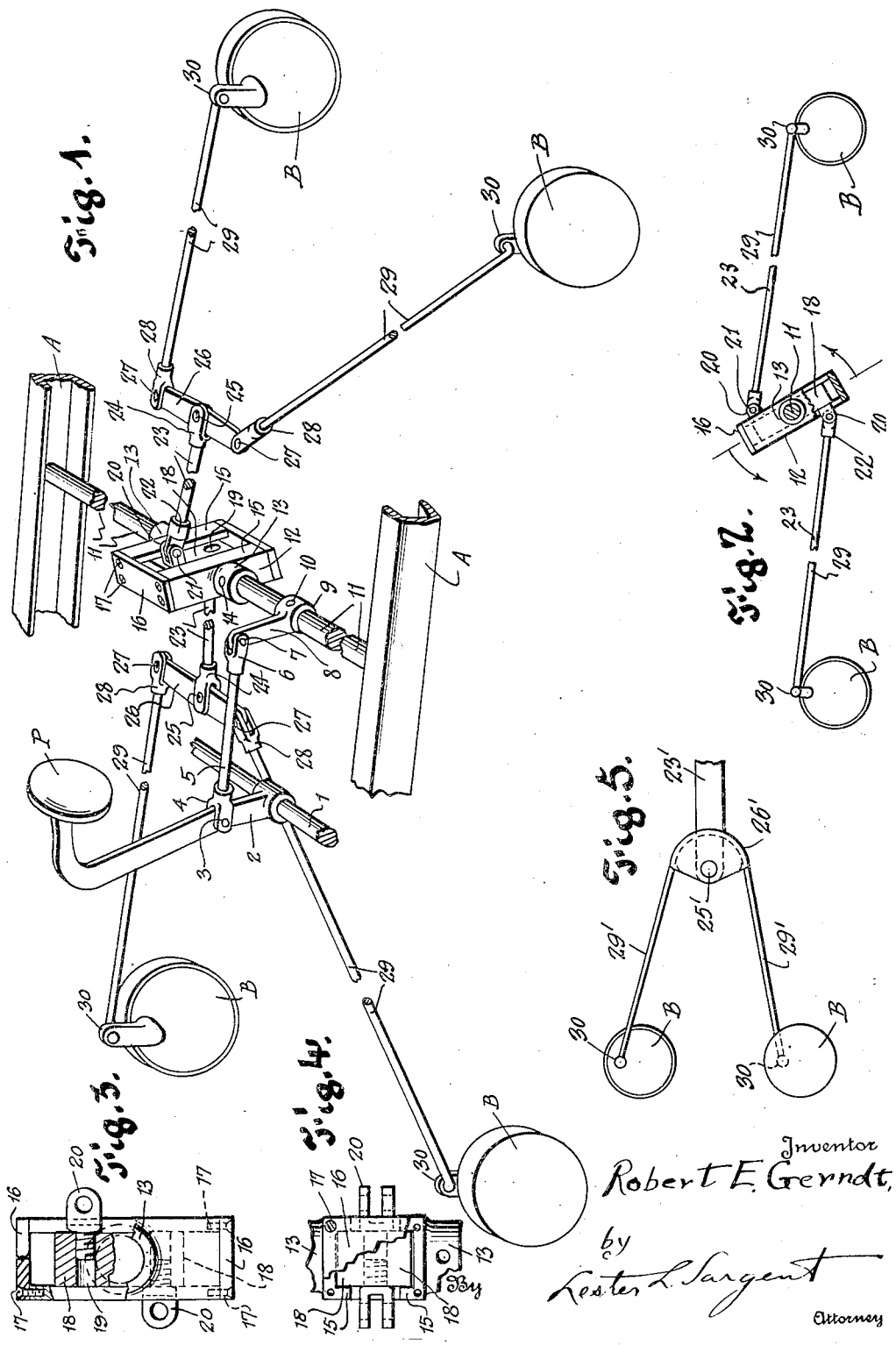

Patented Apr. 18, 1939

2,155,042

UNITED STATES PATENT OFFICE 2,155,042

FOUR-WHEEL BRAKE EQUALIZER

Robert E. Gerndt, Munising, Mich.

Refiled for abandoned application Serial No. 108,870, November 2, 1936. This application September 9, 1938, Serial No. 229,165

3 Claims. (Cl. 188—204)

The object of my invention is to provide a four-wheel brake equalizer that will apply four brakes and keep all brakes equalized as in hydraulic brakes. I attain these and other objects of my invention by the device illustrated in the accompanying drawing, in which—

Figure 1 is a perspective view of the invention;

Fig. 2 is a section through one of the shafts 11, members 24 and 28 inclusive being omitted from this view;

Fig. 3 is a view partly in vertical section and partly in elevation of members 13 and 16 to 20 inclusive;

Fig. 4 is a top plan view of members 13, 16, 17, 18 and 20 with portions broken away.

Fig. 5 is a top plan view of a modified form of brake activating mechanism using a cable instead of rods.

Like numerals designate like parts in each of the several views.

Referring to the accompanying drawing, there is illustrated the usual shaft 1 between the frames on which is mounted a brake pedal 2. The clevis 4 is pivotally connected to the shank of the brake pedal by a pin 3; the drag-link 5 affixed to the clevis 4 is in turn affixed to the clevis 6 which is pivotally connected by pin 7 with the finger lever 8 which terminates in a ring or body affixed to one of the aligned and rotatable shafts 11 by a suitable means such as pin 10. Mounted on the inner ends of shafts 11, preferably as shown in Fig. 1 is a box-like housing 12. Attached to and integral with housing 12 are hollow bosses 13 seated on and affixed to the inner ends of the aligned rotatable shafts 11 by pins 14 (see Fig. 1), securing the bosses 13 to shafts 11. Housing 12 is provided with channels 15, as shown in Figs. 1 and 4; housing 12 has the ends 16 secured in place by suitable means such as screws 17, as shown in Figs. 1 and 3. The sliding block 18 is slidably mounted within the box 12 between the sides 15, as shown in Figs. 1 and 3. This sliding block has threaded holes 19, as shown in Fig. 1 to receive the threaded ends of clevises 20. Affixed to sliding box 18, as illustrated in detail in Fig. 3 is a screw and clevis 20 to which the clevis fitting 22 is pivotally connected by a pivot pin 21. Affixed to clevis fitting 22 is a drag-link 23 to which a clevis 24 is affixed. Pivotally mounted on clevis 24 by pivot pin 25 is the yoke 26. Clevises 28 are pivotally connected by pin 27 to each end of the yoke 26. Clevises 28 are each affixed to the brake rod 29 and are attached to the operating finger 30 of the brake assembly B,
as shown in Fig. 1 of the drawing. There are provided a plurality of the links 23 and a plurality of the clevises 28 attached to the opposite ends of the sliding block 18, the respective clevises 22 being affixed to corresponding links 23, which in turn are attached to the respective yokes 26, thereby operating all four brakes.

The operation of the device will be apparent by careful examination of the drawing in Fig. 1. When the brake pedal 2 is pressed down it in turn operates the clevis 4, the link 5, clevis 6 and finger lever 8, and thus rotates the shaft 11 to which member 8 is affixed; the shaft 11 carries the housing 12 within the slidable box 18. As the box 18 tilts or swings in an arc, it also carries the clevis 20 and operates fitting 22, link 23, clevis 24, yoke 26, clevis 28, links 29 and operating finger 30, which in turn operates the braking mechanism of the braking assemblies B. It will be noted that shafts 11 do not extend through the box but merely extend to its sides and are affixed to the bosses 13 carried by the sides of the box housing 12.

Referring to Fig. 5 of the drawing there is an illustration of a modification of the yoke mechanism in which the yoke 26 is replaced by a wheel or pulley segment 26' pivotally mounted on the links 23' by a pivot pin 25'. A cable 29' passes over the wheel segments 26' and is connected to the respective operating fingers 30 of the brake assemblies B, as shown in Fig. 5. The result of this construction is that there is equalized brake action on all four wheels without the frequent adjustment of brakes. In other words, it offers to the mechanical brake field a mechanism that is equal in action to hydraulic brakes and at the same time it is safer as it is not likely to get out of order as is the case with hydraulic brakes.

What I claim is:

1. In a mechanical four-wheel brake equalizer, the combination of a brake pedal, aligned rotatable shafts spaced from the brake pedal, a finger lever affixed to one of the said shafts, link mechanism operatively connecting the end of the finger lever with the brake pedal; a box-like housing affixed to the inner ends of the aforesaid aligned rotatable shafts, a rigid block slidably mounted within said housing, yokes, a plurality of links pivotally connecting the sliding block with the aforesaid yokes and rods connecting the respective ends of the yoke with the respective four wheel brake assemblies, whereby the operation of the brake pedal will operate all of the brakes simultaneously.

2. In a mechanical four wheel brake equalizer, the combination of a brake pedal, aligned rotatable shafts spaced from the brake pedal; a finger lever affixed to one of the said shafts, link mechanism operatively connecting the end of the finger lever with the brake pedal; a box-like housing affixed to the inner ends of the aforesaid aligned rotatable shafts, a rigid block slidably mounted within said housing, yokes, a plurality of links pivotally connecting the sliding block with the aforesaid yokes and means operativey connecting the respective ends of the yoke with the respective four wheel brake assemblies, whereby operation of the brake pedal will operate all of the brakes simultaneously.

3. In a mechanical four wheel brake equalizer, the combination of a brake pedal, aligned rotatable shafts spaced from the brake pedal; a finger lever affixed to one of the said shafts, link mechanism operatively connecting the end of the finger lever with the brake pedal; a box-like housing affixed to the inner ends of the aforesaid aligned rotatable shafts, a rigid member slidably mounted within said housing, yokes, a plurality of links pivotally connecting the said slidable rigid members with the aforesaid yokes, and rods connecting the respective ends of the yoke with the respective four wheel brake assemblies, whereby operation of the brake pedal will operate all of the brakes simultaneously.

ROBERT E. GERNDT.